United States Patent
Bell et al.

(10) Patent No.: US 10,565,448 B2
(45) Date of Patent: Feb. 18, 2020

(54) READ CONFIRMATION OF ELECTRONIC MESSAGES

(71) Applicant: International Business Machines Corporation, Armonk, NY (US)

(72) Inventors: Denise A. Bell, Austin, TX (US); Jana H. Jenkins, Raleigh, NC (US); Jeffrey A. Kusnitz, Campbell, CA (US); Adriana A. Morales, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 15/678,157

(22) Filed: Aug. 16, 2017

(65) Prior Publication Data

US 2019/0057254 A1 Feb. 21, 2019

(51) Int. Cl.
*G06K 9/00* (2006.01)
*G06F 3/01* (2006.01)
*H04L 12/58* (2006.01)

(52) U.S. Cl.
CPC ....... *G06K 9/00617* (2013.01); *G06K 9/0061* (2013.01); *G06K 9/00335* (2013.01); *G06K 9/00604* (2013.01); *H04L 51/22* (2013.01)

(58) Field of Classification Search
USPC .................................................. 382/103, 100
See application file for complete search history.

(56) References Cited

U.S. PATENT DOCUMENTS

| | | | | |
|---|---|---|---|---|
| 8,887,300 | B1 * | 11/2014 | Gates | H04L 63/10 |
| | | | | 713/168 |
| 9,152,221 | B2 | 10/2015 | Denker et al. | |
| 9,377,853 | B2 | 6/2016 | Taguchi | |
| 9,721,031 | B1 * | 8/2017 | Marcum | G06F 16/9562 |
| 9,829,972 | B2 * | 11/2017 | Conzola | G06K 9/00604 |
| 9,922,034 | B2 * | 3/2018 | Bastide | G06F 16/122 |
| 10,073,603 | B2 * | 9/2018 | Zavattaro | G06F 3/04847 |
| 2015/0007048 | A1 | 1/2015 | Dumans | |
| 2015/0143245 | A1 | 5/2015 | Waldman et al. | |
| 2015/0213634 | A1 * | 7/2015 | Karmarkar | G06T 11/60 |
| | | | | 345/589 |
| 2015/0295863 | A1 * | 10/2015 | Ye | G06F 9/542 |
| | | | | 715/752 |

(Continued)

FOREIGN PATENT DOCUMENTS

| | | |
|---|---|---|
| GB | 2510708 A | 8/2014 |
| WO | 2015175325 A1 | 11/2015 |

OTHER PUBLICATIONS

Zakkai Kauffman-Rogoff, "An Intelligent Tutoring System with Eye tracking-based Scaffolding", Worcester Polytechnic Institute, Apr. 28, 2011, 75 pages.

*Primary Examiner* — Ishrat I Sherali
(74) *Attorney, Agent, or Firm* — Cantor Colburn LLP; Teddi Maranzano

(57) ABSTRACT

Embodiments include techniques for read confirmation of electronic messages, the techniques include displaying a message to a user, and determining one or more portions of the message has been scanned based on a tracking. The techniques also include comparing a threshold to the one or more portions of the message that has been scanned, and presenting an estimated unscanned portion of the message based on the comparison.

20 Claims, 4 Drawing Sheets

(56) References Cited

U.S. PATENT DOCUMENTS

| | | | | |
|---|---|---|---|---|
| 2015/0370323 A1* | 12/2015 | Cieplinski | ............... | G06F 3/013 |
| | | | | 345/156 |
| 2016/0094705 A1* | 3/2016 | Vendrow | .............. | G06K 9/0061 |
| | | | | 382/103 |
| 2017/0111308 A1* | 4/2017 | Kim | ........................ | H04L 51/34 |
| 2017/0235892 A1* | 8/2017 | Sevenster | ............. | G06F 19/321 |
| | | | | 705/2 |
| 2017/0310749 A1* | 10/2017 | Vasek | ................. | H04L 65/1069 |

* cited by examiner

READ CONFIRMATION OF ELECTRONIC MESSAGES

BACKGROUND

The present invention generally relates to electronic messaging, and more specifically, to read confirmation of electronic messages.

In today's environment, electronic messages such as e-mails and user agreements are widely used to exchange information in an efficient manner between participants. Electronic messages are used in enterprise settings, academic, collaborations, etc. which allow the transfer of information between participants that are located in different geographic locations. For example, emails can be transmitted to provide information or request critical information. In addition, electronic messages are not subjected to the chance of physical loss and delay in transmission as traditional mail. Emails can also provide a level of security. Emails also allow the recipients to receive their messages while they are traveling and away from their respective physical addresses.

SUMMARY

Embodiments of the present invention are directed to a computer-implemented method for read confirmation of electronic messages. A non-limiting example of the computer-implemented method includes displaying a message to a user, and determining one or more portions of the message has been scanned based on a tracking. The computer-implemented method also includes comparing a threshold to the one or more portions of the message that has been scanned and presenting an estimated unscanned portion of the message based on the comparison.

Embodiments of the present invention are directed to a system for read confirmation of electronic messages. Non-limiting examples of the system include a storage medium, the storage medium being coupled to a processor, where the processor configured to display a message to a user, and determine one or more portions of the message has been scanned based on a tracking. The processor is further configured to compare a threshold to the one or more portions of the message that has been scanned, and present an estimated unscanned portion of the message based on the comparison.

Embodiments of the invention are directed to a computer program product for read confirmation of electronic messages, the computer program product comprising a computer readable storage medium having program instructions embodied therewith. The program instructions are executable by a processor to cause the processor to perform a method. A non-limiting example of the method includes displaying a message to a user, and determining one or more portions of the message has been scanned based on a tracking. The computer-implemented method also includes comparing a threshold to the one or more portions of the message that has been scanned and presenting an estimated unscanned portion of the message based on the comparison.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
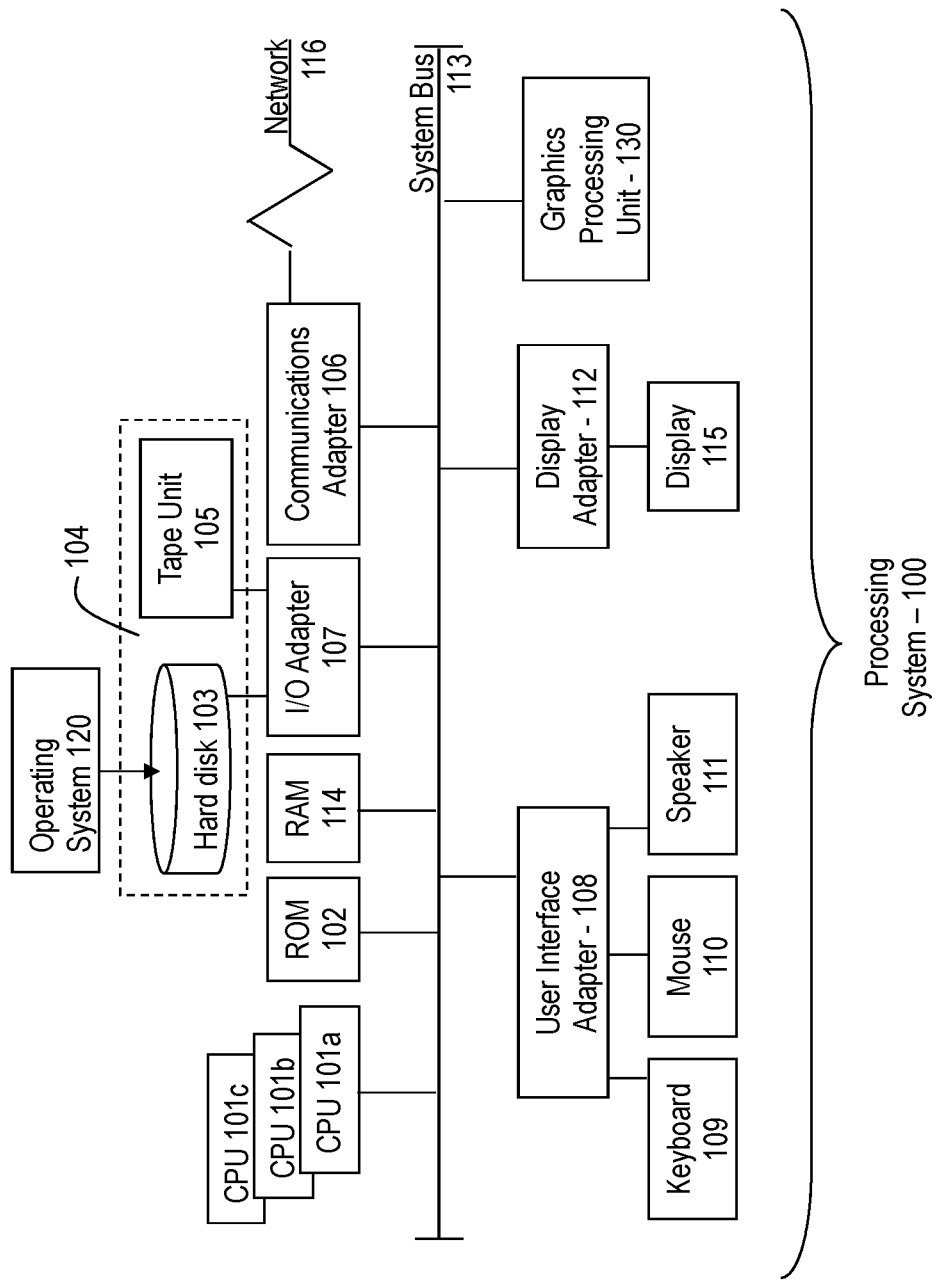
FIG. 1 is a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Although electronic messages provide a convenient means for the exchange of information, as messages get longer and longer readers tend to skim over larger amounts of the content of the message. This can create a scenario where important information goes unread prior to the reader responding to the message. For example, a customer may become dissatisfied due to repeating information that has previously been provided to a customer service representative.

The techniques described herein are related to avoiding the sending of responses without first reading or completely reading the original email. For example, when an email is received, a user may quickly scan the email while skipping large amounts of substantive content. The system can then prompt the user to continue reading based on the amount of content the system has detected the user read. The user may then continue to compose a response to the message requesting information that was already presented the original email or may return to the original message and continue reading.

The above-described aspects of the invention address the shortcomings of the prior art by providing techniques including a system and method for tracking a user's gaze while reading an electronic message, such as an email. The number of words and/or sentences that the user has read can be detected and recorded. If the amount of the message read by the user is less than a configurable threshold, the estimated unread portion of the message will be emphasized and presented to the user. For example, the estimated unread portion will be highlighted and presented to the user. The user can continue reading more of the message or proceed to respond to the message.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
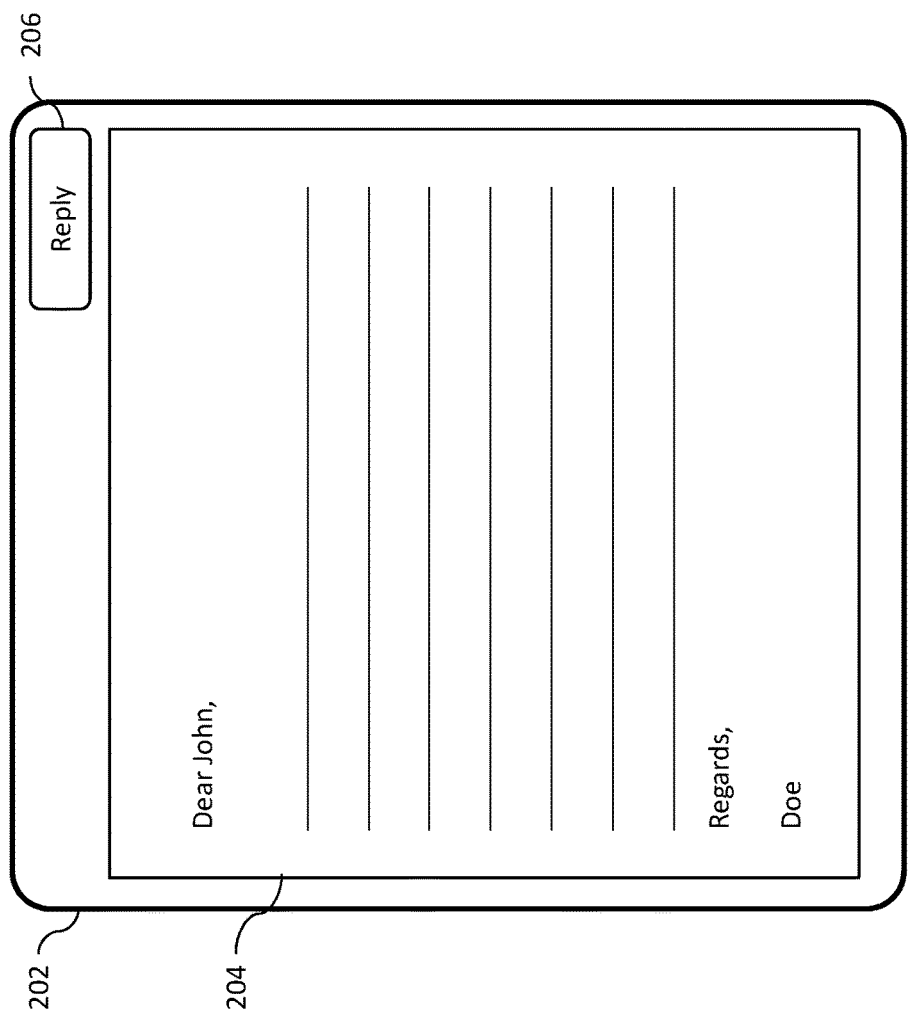
FIG. 2 depicts a display for read confirmation of electronic messages in accordance with one or more embodiments.

Now referring to FIG. 2, a display 200 for read confirmation of electronic messages in accordance with one or more embodiments is shown. The message 204 can be displayed in a window 202. In one or more embodiments, the message 204 can be an email message that is displayed on an interface of a computing device. In another embodiment, the message 204 can be a user agreement or license which requires a user to agree or consent to some information. As the user reads the message 204, a camera device of the system tracks the eye movement of the user. The system is able to detect and record the progress the user has made.

The user can respond to the message 204 by using the reply button 206. Upon selecting the reply button 206 the system can estimate how much of the text of the message has been read by using a camera device to track the user's eye movement. Responsive to estimating the unread portion the system can make a recommendation to the user to continue reading the message 204. The user can determine whether to continue reading the message or proceed with responding to the original message 204.

Figure 3:
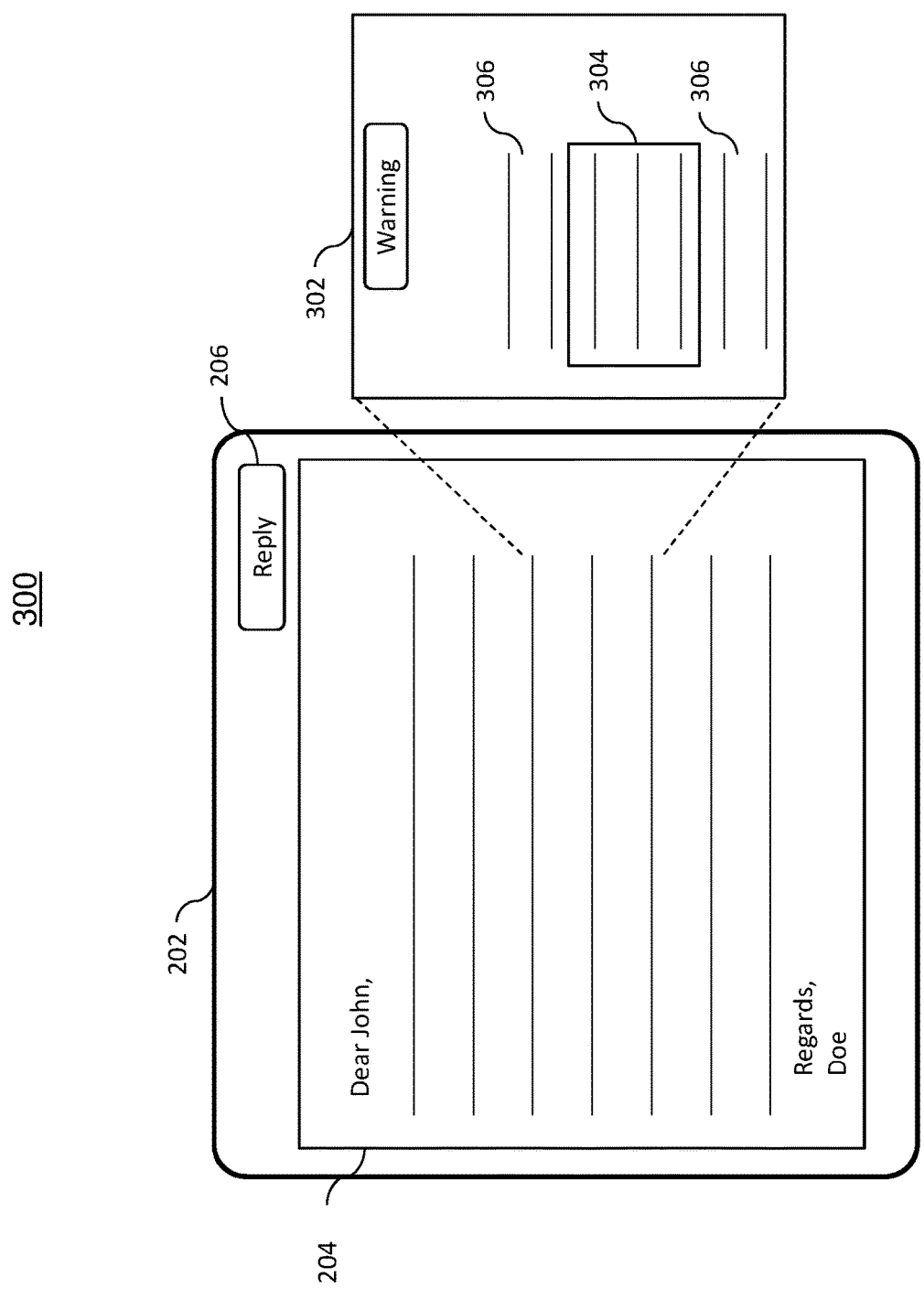
FIG. 3 depicts another display for read confirmation of electronic messages in accordance with one or more embodiments.

Now referring to FIG. 3, a display 300 for read confirmation of electronic messages in accordance with one or more embodiments is shown. The display 300 includes a message 204 of a window 202 similar to that shown in FIG. 2.

The display 300 includes a pop-up message 302. In one or more embodiments, the pop-up message is displayed in a separate window. The pop-up message 302 includes the estimated unread or unscanned portion of the message 204. The pop-up message 302 is provided as a warning or recommendation to the user to continue reading the unread portions prior to replying or submitting an agreement. In one or more embodiments, the user can simply dismiss the pop-up message 302 and continue responding to the original message 204. In other embodiments, users may be forced to continue reading the pop-up message 302 based on a configuration under the control of a system administrator.

The pop-up message 302 can include the unread texts 304 of the message 204 and portions of the read texts 306. In one or more embodiments, the unread texts can be emphasized and the read text can be deemphasized. In other embodiments, if the user chooses to continue to read the message 204 or the pop-up message 302, the camera can continue to detect the user's eye movement and the text can be deemphasized as it is determined that the portions of the message 204 or the pop-up message 302 have been read. In one or more embodiments, responsive to the user reading a configurable threshold amount, the user will be able to continue with responding to the original message 204.

Figure 4:
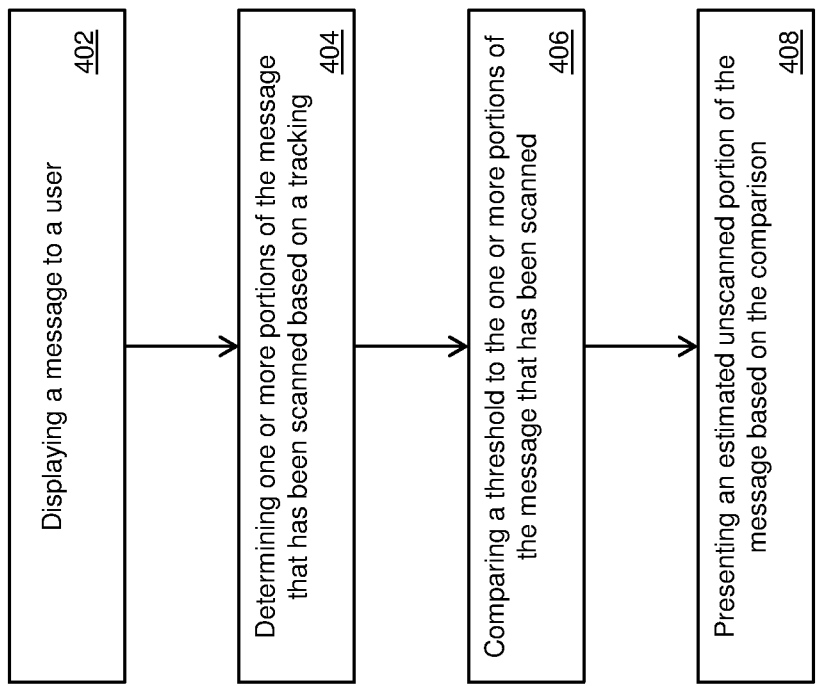
FIG. 4 depicts a flow diagram for read confirmation of electronic messages in accordance with one or more embodiments.

Now referring to FIG. 4, a method 400 for read confirmation of electronic messages is provided. Block 402 provides displaying a message to a user. In one or more embodiments, the message is an email or other electronic document. Other examples can include agreements such as license agreements, update notifications, enterprise policy changes. In examples that do not require a response, the unread portion can be provided to the user when it is triggered by the user attempting to close the window. Other triggers can include an "accept" button.

In one or more embodiments, an internal map is generated for the message. The internal map includes creating a map for tracking the words, sentences, and paragraphs of the message. The internal map is used to manage which words, sentences, and paragraphs have been read.

Block 404 provides determining one or more portions of the message has been scanned based on a tracking. In one or more embodiments, the tracking can be performed by a camera device which tracks the position of a user's eye to determine whether portions of the message have been looked at and read by the user. The camera device performing the tracking of the user's eye can determine which words have been looked at, which sentences have been looked at, and also which paragraphs have been read.

Block 406 provides comparing a threshold to the one or more portions of the message that has been scanned. In one or more embodiments, the threshold is a configurable threshold. In a different embodiment, the threshold can be a predetermined threshold based on the historical accounting of the user determining to have read most of their emails. Non-limiting examples include an amount of time, the number of words, sentences, or paragraphs, a ratio or percentage of words, sentences, or paragraphs. The thresholds are all relative to the length of the complete document.

Block 408 provides presenting an estimated unscanned portion of the message based on the comparison. In one or more embodiments, the input received from the camera is used to compare the amount of the message that has been looked at to the threshold. If it is determined that the threshold has not been reached, in one or more embodiments, the system will provide a pop-up on the display indicating which portions of the original has not been read.

In one or more embodiments, the presenting includes generating a pop-up message including the unscanned portion of the message. The one or more unread portions of the message can be displayed to the user in a separate window. In one or more embodiments, wherein presenting unread portion is emphasized and the read portion is deemphasized. The emphasis on the unread portion can be performed by underlining, highlighting, bolding, and other known techniques to differentiate the unread text from the read text. In another embodiment, the separate pop-up window may only include the unread portions of the message. In a different example, the pop-up window can display the portions of the message that have been read in an unreadable manner such as blurring the read portions.

In one or more embodiments, the presenting includes highlighting the estimated unscanned portion of the message. In one or more embodiments, the highlighted portion becomes unhighlighted as it is determined the one or more portions of the message is scanned.

In one or more embodiments, the comparison and presentation of the unread portion can be triggered by the user. For example, the user may hit the "reply" button to respond to the email and the comparison whether the user has read enough of the email or not. If not, the pop-up window can be provided to the user.

In a different embodiment, the user can simply ignore the recommendation of the pop-up window and proceed to the next step such as sending the email or responding to a message. In one or more embodiments, the threshold can be configured based on the user's historical performance. For example, a default threshold can be configured to require the user to read 85% percent of the words in the message. If after 10 replies to emails the user has not received a warning, the user's threshold can be updated to 75%. As the example continues if the user does not receive any warnings or recommendations from the system, the threshold can be scaled back to 65%. In order to maintain the reliability of the responses to the emails, the system can be configured with a hard minimum threshold where a user that consistently reads their messages cannot surpass.

In one or more embodiments, the system can differentiate between the previous messages such as those in an email chain and only require the user read the latest message(s). In one or more embodiments, as the user reads the unread portion in the pop-up the highlighted portion can be unhighlighted to indicate which portions the user has read of the unread portion. In a different embodiment, as the user proceeds, the emphasized and deemphasized portions can be provided in the original message as the user dismisses the pop-up. The reading of the pop-up message is detected by a camera device which tracks the user's gaze.

In one or more embodiments, an administrator can control the ability of the user to skip the reading of the message. In other embodiments, the user may not be required to continue reading more of the message prior to continuing.

In one or more embodiments, a configurable threshold is used to enable one or more options. For example, a send or submit button of an email message can be initially disabled and subsequently enabled after the system determines upon determining a configurable threshold number of lines has been read by the user.

In one or more embodiments, the threshold is based on a percentage of reading the complete email. In a different, the threshold can be based on a duration of time spent on an email. In one or more embodiments, gaze tracking is used to monitor the user as the user reads the message. The gaze tracking is used to gauge how much of the message was actually read.

In one or more embodiments, the system parses the document and creates an internal list of all of the words/sentences/paragraphs within the document. The system tracks a user's gaze and indicates within its internal map which words/sentences/paragraphs have been looked at. In one or more embodiments, a word is considered looked at when the user has gazed at it for a predetermined/configurable amount of time. In another embodiment, a sentence is considered looked at when some percentage of the words within the sentence have been looked at. In other embodiments, a paragraph is considered looked at when some percentage of its sentences have been looked at.

If users are required to read more and more of their emails prior to sending a reply, the amount of resources, such as CPU utilization and memory usage, can be increased. The increased resource capacity can be allocated to other processes to increase the efficiency and operation thereof. Unneeded responses, such as those requesting information which has clearly been provided in a previous message can be decreased reducing the clutter in storage and wasted processing. This issue can scale in scenarios where the large enterprises send out group or department emails.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for read confirmation of electronic messages, the computer-implemented method comprising:
    displaying a message to a user;
    determining one or more portions of the message has been scanned based on a tracking;
    comparing a threshold to the one or more portions of the message that has been scanned, wherein the threshold is less than an entirety of the message; and
    presenting an estimated unscanned portion of the message based on the comparison.

2. The computer-implemented method of claim 1, wherein the determining includes creating an internal list for listing of each of words, sentence, and paragraph of the message.

3. The computer-implemented method of claim 1, wherein a word of the message is determined to have been scanned when it is detected the word is gazed at for a configurable threshold amount of time.

4. The computer-implemented method of claim 1, wherein a sentence of the message is considered scanned when a threshold number of words within the sentence have been gazed at for a threshold amount of time.

5. The computer-implemented method of claim 1, wherein a paragraph of the message is considered scanned when a threshold number of its sentences have been gazed at.

6. The computer-implemented method of claim 1, wherein the presenting includes generating a pop-up message including an unscanned portion of the message.

7. The computer-implemented method of claim 1, wherein the presenting includes emphasizing an unscanned portion and deemphasizing a scanned portion of the message.

8. The computer-implemented method of claim 7, wherein the emphasizing includes highlighting the estimated unscanned portion of the message.

9. The computer-implemented method of claim 8, wherein the highlighting becomes unhighlighted as it is determined the estimated unscanned portion of the message is scanned.

10. A system for read confirmation of electronic messages, the system comprising:
    a storage medium, the storage medium being coupled to a processor;
    the processor configured to:
        display a message to a user;
        determine one or more portions of the message has been scanned based on a tracking;
        compare a threshold to the one or more portions of the message that has been scanned, wherein the threshold is less than an entirety of the message; and
        present an estimated unscanned portion of the message based on the comparison.

11. The system of claim 10, wherein the presenting includes generating a pop-up message including an unscanned portion of the message.

12. The system of claim 10, wherein the presenting includes emphasizing an unscanned portion and deemphasizing a scanned portion of the message.

13. The system of claim 12, wherein the emphasizing includes highlighting the estimated unscanned portion of the message.

14. The system of claim 13, wherein the highlighting becomes unhighlighted as it is determined the estimated unscanned portion of the message is scanned.

15. A computer program product for read confirmation of electronic messages, the computer program product comprising:
    a non-transitory computer readable storage medium having stored thereon first program instructions executable by a processor to cause the processor to:
    display a message to a user;
    determine one or more portions of the message has been scanned based on a tracking;
    compare a threshold to the one or more portions of the message that has been scanned, wherein the threshold is less than an entirety of the message; and
    present an estimated unscanned portion of the message based on the comparison.

16. The computer program product of claim 15, wherein the determining includes creating an internal list for listing of each of words, sentence, and paragraph of the message.

17. The computer program product of claim 15, wherein the presenting includes generating a pop-up message including an unscanned portion of the message.

18. The computer program product of claim 15, wherein the presenting includes emphasizing an unscanned portion and deemphasizing a scanned portion of the message.

19. The computer program product of claim 18, wherein the emphasizing includes highlighting the estimated unscanned portion of the message.

20. The computer program product of claim 19, wherein the highlighting becomes unhighlighted as it is determined the estimated unscanned portion of the message is scanned.

* * * * *